(12) United States Patent
Hsieh et al.

(10) Patent No.: US 7,337,619 B2
(45) Date of Patent: Mar. 4, 2008

(54) METHOD AND SYSTEM FOR ASSESSING A REFRIGERANT CHARGE LEVEL IN A VEHICLE AIR CONDITIONING SYSTEM

(75) Inventors: Hsiao-An Hsieh, Troy, MI (US); Francois Charette, Canton, MI (US); Steven Lake, Manchester, MI (US); Harish Maruvada, Canton, MI (US); Mike Calkins, Macomb Township, MI (US); Alex Przebienda, Northville, MI (US); David Volker, Wixom, MI (US)

(73) Assignee: Ford Motor Company, Dearborn, MI (US)

( * ) Notice: Subject to any disclaimer, the term of this patent is extended or adjusted under 35 U.S.C. 154(b) by 499 days.

(21) Appl. No.: 10/709,728

(22) Filed: May 25, 2004

(65) Prior Publication Data

US 2005/0262855 A1 Dec. 1, 2005

(51) Int. Cl.
*G01K 13/00* (2006.01)
*F25B 41/00* (2006.01)
*F25B 45/00* (2006.01)

(52) U.S. Cl. .............................. 62/129; 62/149; 62/208
(58) Field of Classification Search .................. 62/126, 62/129, 207, 208, 127, 149, 209, 174
See application file for complete search history.

(56) References Cited

U.S. PATENT DOCUMENTS

| | | | |
|---|---|---|---|
| 4,463,573 A | 8/1984 | Zeno et al. | |
| 4,463,576 A | 8/1984 | Burnett et al. | |
| 4,561,261 A | 12/1985 | Kornrumpf et al. | |
| 4,577,469 A | 3/1986 | Okura | |
| 4,966,013 A | 10/1990 | Wood | |
| 4,967,567 A * | 11/1990 | Proctor et al. | 62/127 |
| 5,009,074 A | 4/1991 | Goubeaux et al. | |
| 5,201,862 A | 4/1993 | Pettitt | |
| 5,457,965 A | 10/1995 | Blair et al. | |
| 5,481,884 A * | 1/1996 | Scoccia | 62/129 |
| 5,586,445 A | 12/1996 | Bessler | |
| 5,689,963 A | 11/1997 | Bahel et al. | |
| 5,987,903 A * | 11/1999 | Bathla | 62/129 |
| 6,293,114 B1 * | 9/2001 | Kamemoto | 62/129 |
| 6,318,097 B1 | 11/2001 | Wieszt | |
| 6,430,947 B2 * | 8/2002 | Bascobert | 62/133 |
| 2001/0003903 A1 | 6/2001 | Liu et al. | |
| 2001/0032473 A1 | 10/2001 | Liu et al. | |

\* cited by examiner

*Primary Examiner*—Marc Norman
(74) *Attorney, Agent, or Firm*—Raymond L. Coppiellie; Brooks Kushman P.C.

(57) ABSTRACT

A method and system for assessing a level of refrigerant in a vehicle air conditioning system. A refrigerant charge value is determined as a function of ambient air temperature, ambient air humidity, conditioned air temperature, and compressor cycling signals. The refrigerant charge value is compared to a threshold value to determine whether the level of refrigerant is acceptable.

20 Claims, 2 Drawing Sheets

METHOD AND SYSTEM FOR ASSESSING A REFRIGERANT CHARGE LEVEL IN A VEHICLE AIR CONDITIONING SYSTEM

BACKGROUND OF INVENTION

1. Field of the Invention

The present invention relates to a method and a system for assessing a level of refrigerant charge in a vehicle air conditioning system.

2. Background Art

Vehicle air conditioning systems must have an adequate amount or "charge" of refrigerant to effectively cool vehicle occupants. This refrigerant charge is provided during vehicle assembly operations or after the air conditioning system is serviced.

Previously, technicians determined whether the refrigerant charge was adequate by turning on the air conditioning system and manually feeling the temperature of the air blown into the vehicle passenger compartment. Such subjective assessments were inaccurate, unreliable, and lacked repeatability. Moreover, inaccurate refrigerant charge assessments result in ineffective air conditioning performance, customer complaints, and increased warranty and repair costs.

Before applicant's invention, there was a need for a method and a system for quickly assessing the level of refrigerant charge in a vehicle air conditioning system and to do so in an accurate and repeatable manner. Problems associated with the prior art as noted above and other problems are addressed by Applicant's invention as summarized below.

SUMMARY OF INVENTION

According to one aspect of the present invention, a system for assessing a refrigerant charge level in a vehicle air conditioning system is provided. The system includes a first sensor for providing a cooled air temperature signal, a second sensor for providing an ambient air temperature signal, a third sensor for providing an ambient air humidity signal, and a fourth sensor for providing a compressor cycling signal. A processing unit is used to determine a level of refrigerant charge as a function of the signals from the first, second, third, and fourth sensors. An indicator indicates that the level of refrigerant charge is acceptable if the level of refrigerant charge is greater than a threshold value. A second indicator may indicate that the level of refrigerant is unacceptable.

The first and second sensors may be temperature sensors. The third sensor may be a humidity sensor. The first, second, and third sensors may be disposed apart from the vehicle. Alternately, at least one of the sensors selected from the group consisting of the first, second, and third sensors may be disposed on the vehicle.

The third sensor may be disposed on the vehicle and connected to an air conditioning control module that controls a cooled air temperature provided by the vehicle air conditioning system.

The fourth sensor may be a voltage sensor. The fourth signal may be provided by a powertrain control module mounted on the vehicle that controls engagement of a compressor clutch.

According to another aspect of the invention, a method for assessing a level of refrigerant charge in a vehicle air conditioning system is provided. The vehicle air conditioning system includes a refrigerant subsystem having a compressor adapted to circulate a refrigerant and an air handling subsystem for providing air cooled by the refrigerant subsystem to a vehicle passenger compartment. A control module is adapted to receive first, second, third, and fourth signals indicative of a cooled air temperature, ambient temperature, ambient air humidity, and cycling of the compressor, respectively.

The method includes the steps of calculating a refrigerant charge value indicative of an amount of refrigerant in the vehicle air conditioning system as a function of the first, second, third, and fourth signals. The refrigerant charge value is compared to a threshold value indicative of a desired refrigerant charge amount. If the refrigerant charge value is greater than the threshold value, the system signals that the level of refrigerant is acceptable.

The first signal may be provided by a temperature sensor disposed near a vent aperture in the air handling subsystem. The first and fourth signals may be sampled more frequently than the second and third signals.

According to another aspect of the invention, a method of assessing a level of refrigerant charge in an air conditioning system disposed in a vehicle is provided. The vehicle includes an engine, a compressor adapted to be driven by the engine, and a duct. The compressor has a clutch and is adapted to circulate a refrigerant to provide a cooling effect when the clutch is engaged. The duct provides air cooled by the refrigerant to a vehicle passenger compartment. A first signal indicative of a cooled air temperature, a second signal indicative of an ambient air temperature, a third signal indicative of an ambient air humidity, and fourth signal indicative of engagement of the clutch are provided.

The method includes the steps of calculating a refrigerant charge value as a function of the first, second, third, and fourth signals. The refrigerant charge value is compared to a threshold value indicative of a desired amount of refrigerant. A signal indicating that the level of refrigerant is acceptable is produced if the refrigerant charge value exceeds the threshold value. A signal that the level of refrigerant is not acceptable may be produced if the refrigerant charge value does not exceed the threshold value.

DETAILED DESCRIPTION

Figure 1:
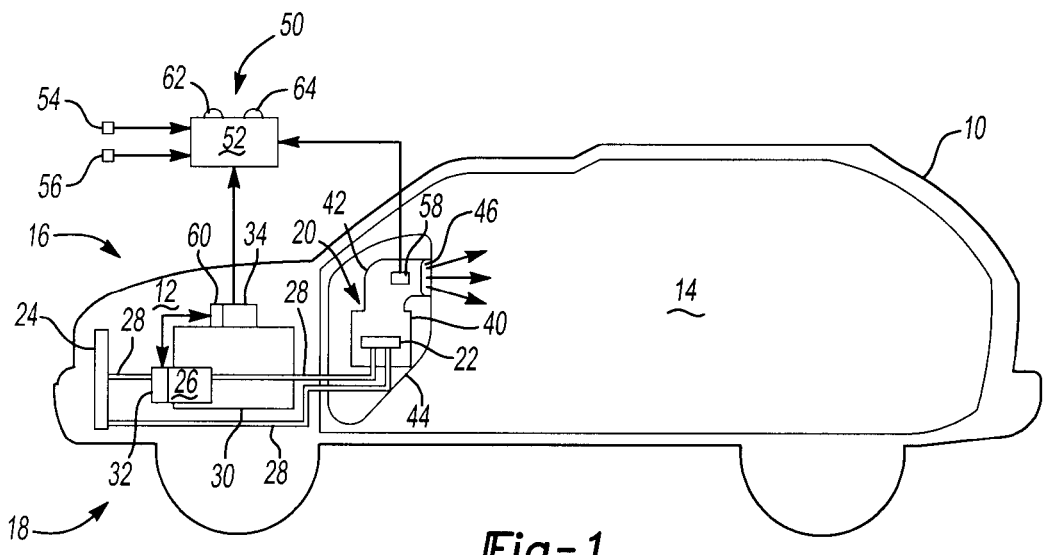
FIG. 1 is a schematic of a vehicle and a system for determining a level of refrigerant in a vehicle air conditioning system.

Referring to FIG. 1, a schematic representation of a vehicle 10 is shown. The vehicle 10 may be of any suitable type, such as a car or truck.

The vehicle 10 includes an engine compartment 12, a passenger compartment 14, and an air conditioning system 16. The air conditioning system 16 is disposed in the engine and passenger compartments 12, 14 and is used to cool the passenger compartment 14.

The air conditioning system 16 includes a refrigerant subsystem 18 and an air handling subsystem 20. The refrigerant subsystem 18 transfers heat from the passenger compartment 14 to the surrounding environment. More specifically, the refrigerant subsystem 18 circulates a refrigerant to provide a cooling effect using refrigeration principles known by those skilled in the art. The refrigerant may be of any suitable type, such as R-134a or carbon dioxide ($CO_2$). The refrigerant subsystem 18 may have any suitable configuration. For example, the refrigerant subsystem 18 in FIG. 1 includes an evaporator 22 for transferring heat to the refrigerant, a condenser 24 for transferring heat from the refrigerant to the surrounding environment, a compressor 26, and conduits 28, such as tubing or hoses, for interconnecting the refrigerant subsystem components.

The compressor 26 circulates and pressurizes the refrigerant. The compressor 26 may be of any suitable type, such as piston or scroll type, and may have a fixed or variable displacement. The compressor 26 may be driven by any suitable means. In one embodiment, the compressor 26 is driven by internal combustion engine 30. More specifically, the compressor 26 may include a clutch 32 and be connected to the engine 30 by a belt (not shown). When the clutch 32 is engaged, the engine 30 drives the compressor 26. When the clutch 32 is disengaged, the engine 30 does not drive the compressor 26. Engagement and disengagement of the clutch 32 may be controlled with a control module 34, such as a powertrain or engine control module.

The air handling subsystem 20 circulates air in the passenger compartment 14. The air handling subsystem 20 may have any suitable configuration. In the embodiment shown in FIG. 1, the air handling system 20 includes a plenum 40 and a duct 42 disposed in an instrument panel 44. The instrument panel 44 includes a vent aperture 46 connected to the duct 42. The vent aperture 46 may have a register (not shown) that allows a passenger to direct air to various parts of the passenger compartment 14. Optionally, a portion of the air handling subsystem 20 may be disposed in the engine compartment 12.

Figure 2:
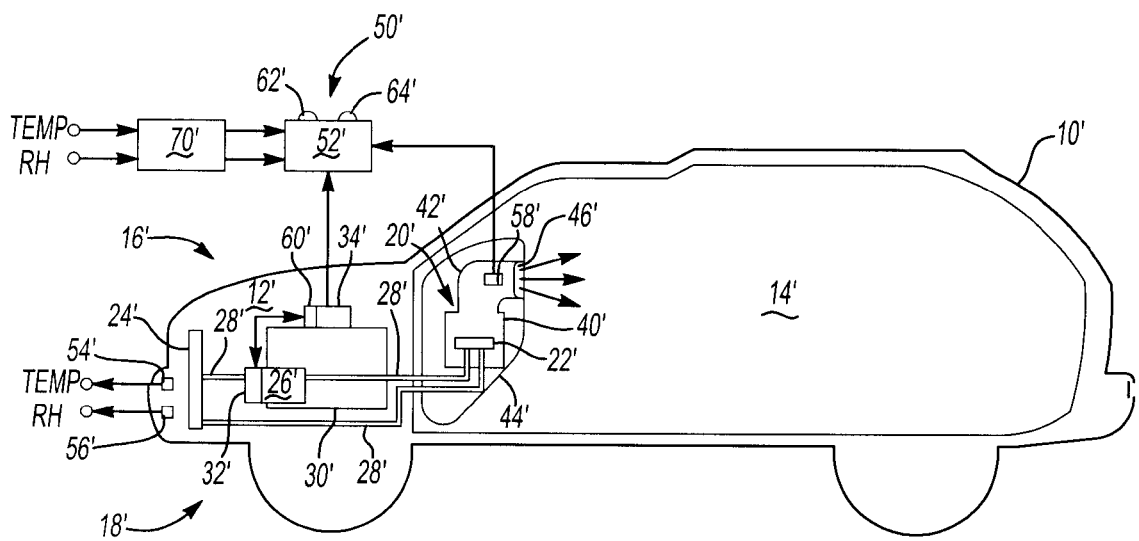
FIG. 2 is another embodiment of the system for determining the level of refrigerant.

Referring to FIGS. 1 and 2, embodiments of a system for determining the level of refrigerant in the air conditioning system will now be described. For clarity, the system will be described primarily with reference to embodiment shown in FIG. 1. In FIG. 2, features common with the embodiment shown in FIG. 1 are designated by the same reference number and a prime (') symbol.

Referring to FIG. 1, the system 50 includes a control unit or module 52. The module 52 receives and processes input signals from various sensors. These sensors include an ambient temperature sensor 54, a humidity sensor 56, a vent temperature sensor 58 and a compressor cycling sensor 60. The module 52 may include a processing unit, such as a microprocessor, to process the input signals and assess a level of refrigerant charge as will be described in more detail below.

The ambient temperature sensor 54 detects the temperature of the air in the environment surrounding the vehicle 10. The ambient temperature sensor 54 may be of any suitable type, such as a thermocouple or thermistor. Similarly, the humidity sensor 56 detects humidity of the surrounding ambient air and may have any suitable configuration. Optionally, the ambient temperature sensor 54 and humidity sensor 56 may be combined into a single sensor or sensor module.

The ambient temperature sensor 54 and humidity sensor 56 may be disposed in any suitable location. For example, in the embodiment shown in FIG. 1 the sensors 54, 56 are disposed on or adjacent to the module 50. Alternatively, the ambient temperature sensor and/or humidity sensor may be disposed on the vehicle. In the embodiment shown in FIG. 2, the ambient temperature sensor 54' and humidity sensor 56' are shown disposed on the vehicle 10' outside the passenger compartment 14'.

Optionally, one or more of the sensors may be connected to an air conditioning control module that controls the operation of the air conditioning system. For example, in FIG. 2, sensors 54' and 56' are connected to the air conditioning control module 70'. For clarity, the connections between the control module 70' and sensors 54', 56' are denoted by references TEMP and RH, respectively. The air conditioning control module 70' may be an electronic automatic temperature control (EATC) module that is designed to control the temperature in one or more zones in the passenger compartment.

The passenger compartment or vent temperature sensor 58 detects the temperature of the air cooled by the refrigerant subsystem 18. The vent temperature sensor 58 may be of any suitable type, such as a thermocouple, thermistor, or infrared heat gun. The vent temperature sensor 58 may be disposed in any suitable location downstream of the evaporator 22. In the embodiments shown in FIGS. 1 and 2, the vent temperature sensor 58,58' is shown disposed in the duct 42,42'. Moreover, the vent temperature sensor 58,58' may be manually positioned by an operator near the vent aperture 46,46' or positioned inside the duct 42,42'.

The compressor cycling sensor 60 detects the operating state of the compressor 26. Specifically, the compressor cycling sensor 60 detects whether the compressor is on or off. The compressor cycling sensor 60' be of any suitable type and have any suitable configuration. For instance, the compressor cycling sensor 60 may be a voltage sensor connected to the clutch 32. In the embodiment shown in FIGS. 1 and 2, the compressor cycling sensor 60,60' provides a signal to the module 52,52' via the powertrain control module 34,34'. Optionally, the functionality of the compressor cycling sensor 60',60' may be integrated with the control module 34,34', in which case the control module 34,34' would provide the signal indicative of the operating state of the compressor.

The module 52 may include one or more indicators. The indicators may be of any suitable type, and may provide audible and/or visual feedback. In the embodiment shown in FIGS. 1 and 2, the module 50,50' includes first 62,62' and second 64,64' indicators that indicate whether the refrigerant charge is acceptable or unacceptable, respectively.

Figure 3:
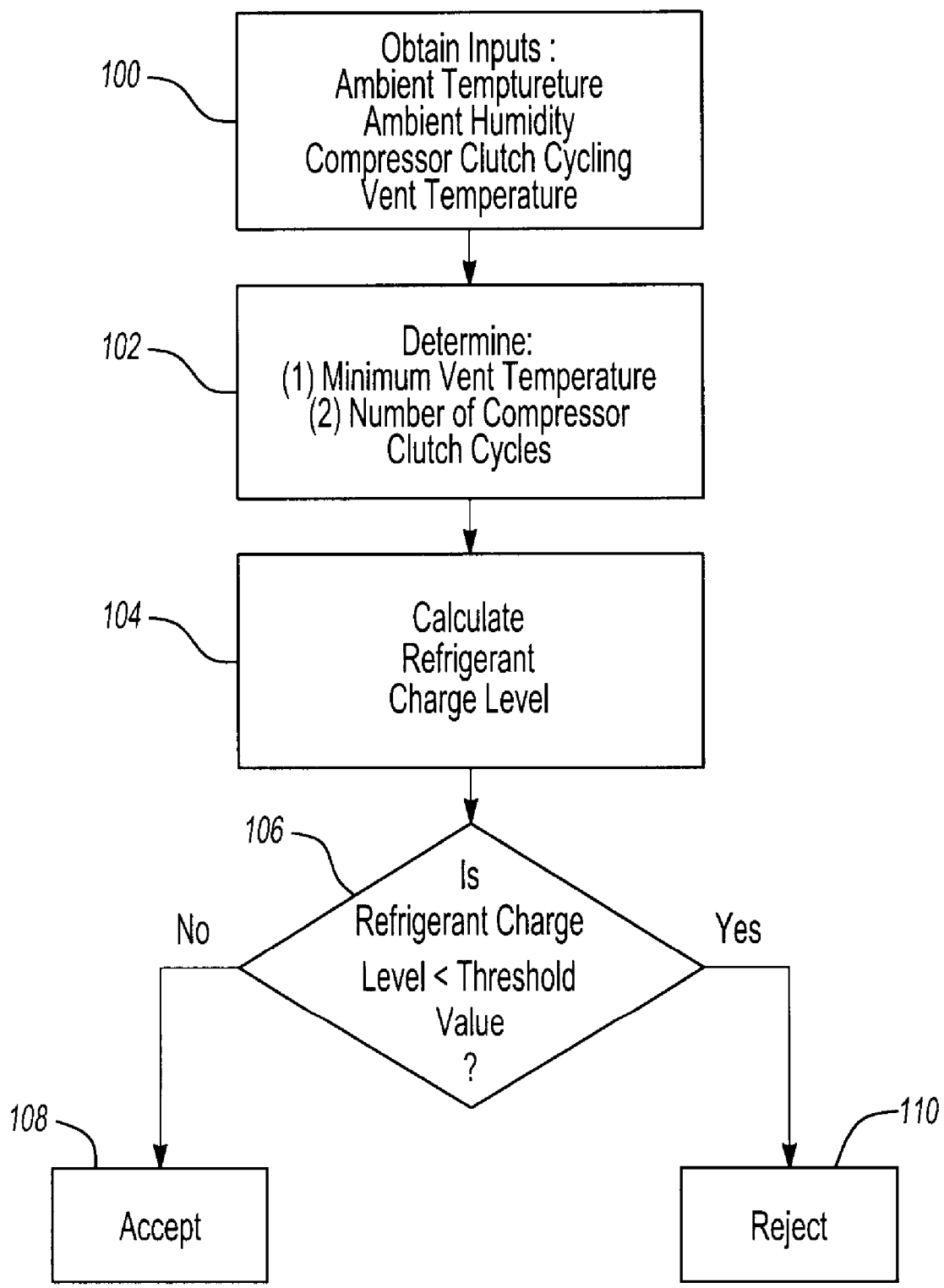
FIG. 3 is a flowchart of a method for determining the level of refrigerant in the vehicle air conditioning system.

Referring to FIG. 3, a flowchart of a method for assessing a level of refrigerant in a vehicle air conditioning system is shown. For clarity, the method will be described with reference to the embodiment shown in FIG. 1. However, the method may be used with any embodiment of the system.

As will be appreciated by one of ordinary skill in the art, the flowchart represents control logic which may be implemented or effected in hardware, software, or combination of hardware and software. For example, the various functions may be effected by a programmed microprocessor.

The control logic may be implemented using any of a number of known programming or processing techniques or strategies and is not limited to the order or sequence illustrated. For instance, interrupt or event-driven processing is typically employed in real-time control applications. Such as control of an engine or vehicle subsystem rather than a purely sequential strategy as illustrated. Likewise, pair processing, multitasking, or multi-threaded systems and methods may be used to accomplish the objectives, features and advantages of the present invention.

This invention is independent of the particular programming language, operating system processor, or circuitry used to develop and/or implement the control logic illustrated. Likewise, depending upon the particular programming language in processing strategy, various functions may be performed in the sequence illustrated at substantially the same time or in a different sequence while accomplishing the features and advantages of the present invention. The illustrated functions may be modified or in some cases admitted without departing from the spirit or scope of the present invention.

In one embodiment of the present invention, the method may be executed by the control module 52. Moreover, the method may be enabled or disabled based on the operating state of the engine 12 and/or air conditioning system 16. For example, execution of the method may be disabled if the engine 12 is not running or if the air conditioning system 16 is not turned on.

At 100, the flowchart begins by obtaining inputs indicative of the current operating conditions. The input signals may be provided to the module 52 by sensors 54, 56, 58, and 60. Alternatively, one or more signals may be provided via the powertrain control module 34. The ambient air temperature and ambient air humidity are sampled at least once since these signals are unlikely to vary much during a short period of time. The vent temperature and compressor cycles are sampled more than once since these signals are likely to change over time. Sampling of one or more of these signals may continue for a predetermined period of time, a minimum period of time, or until a signal having a predetermined characteristic is received. For example, sampling may continue for a predetermined (minimum) number of compressor cycles.

At 102, the minimum vent temperature value detected by the vent temperature sensor 46 during the sampling period is determined. In addition, the number of compressor cycles (e.g., the number of times the compressor clutch is engaged or disengaged) during the sampling period is counted.

At 104, the input signals are used to calculate a estimated refrigerant charge level. The refrigerant charge level is an estimate of the amount of refrigerant in the air conditioning system. The estimated refrigerant charge level may be normalized or converted into a percentage value related to a "full" refrigerant charge. The refrigerant charge level may by calculated with the following equation:

$$\text{Charge Level} = A1 + A2*(F1) + A3*(F2) + A4*(F3) + A5*(F4) + A6*(F5) + A7*(F6) + A8*(F7) + A9*(F8) + A10*(F9) + A11*(F10) + A12*(F11) + A13*(F12)$$

where:

$F1$=larger numeric value of either 0 or (CYCLE COUNT$-A14$) where CYCLE COUNT is the number of times the compressor cycles between the engaged and disengaged states;

$F2$=larger numeric value 0 or ($A15-$CYCLE COUNT);

$F3$=larger numeric value of 0 or (VENT TEMPERATURE$-A16$) where VENT TEMPERATURE is the temperature of the air provided by the air handling subsystem to the passenger compartment;

$F4$=larger numeric value of 0 or ($A17-$VENT TEMPERATURE);

$F5$=larger numeric value of either 0 or (CYCLE COUNT$-A18$);

$F6$=larger numeric value of either 0 or (HUMIDITY$-A19$) where HUMIDITY is the ambient air humidity, $F7$=larger numeric value of either 0 or ($A20-$HUMIDITY);

$F8$=larger numeric value of either 0 or (TEMPERATURE$-A21$) where TEMPERATURE is the ambient air temperature;

$F9$=larger numeric value of either 0 or ($A22-$TEMPERATURE);

$F10$=larger numeric value of either 0 or (HUMIDITY$-A23$);

$F11$=larger numeric value of either 0 or (HUMIDITY$-A24$);

$F12$=larger numeric value of either 0 or (TIME$-A25$) where TIME is the duration that the compressor is engaged; and $A1$ through $A25$ are constants.

The values of coefficients A1 through A25 may be based on assessments of vehicle air conditioning system performance. For example, computer modeling or empirical data of vehicle air conditioning system performance may be analyzed using various statistical techniques, such as multi-attribute regression splines (MARS) or other statistical or data analysis techniques. These data analysis techniques may result in different coefficient values and/or a different number of equation terms for different air conditioning systems. For example, following equation was derived for determining the refrigerant charge level on a 2003 model year Ford Taurus sedan:

$$\text{Charge Level} = 53.022 - 4.034*F1 + 13.095*F2 - 0.671*F3 + 3.109*F4 + 19.556*F5 + 8.375*F6 + 0.326*F7 - 0.798*F8 + 0.249*F9 - 11.370*F10 + 3.452*F11 + 0.205*F12$$

At 106, the calculated refrigerant charge level is compared to at a predetermined limit or threshold value to determine if the refrigerant charge is acceptable. If the refrigerant charge level is greater than the threshold value, the method continues at block 108 where an "accept" signal is provided. If the refrigerant charge level is less than the predetermined value, then the method continues at block 110 where a reject signal is provided. The accept or reject signals may be used to control one or more indicators as previously described.

While the best mode for carrying out the invention has been described in detail, those familiar with the art to which this invention relates will recognize various alternative designs and embodiments for practicing the invention as defined by the following claims.

The invention claimed is:

1. A system for assessing a refrigerant charge level in a vehicle air conditioning system, the system comprising:
   a first sensor for providing a cooled air temperature signal;
   a second sensor for providing an ambient air temperature signal;
   a third sensor for providing an ambient air humidity signal;
   a fourth sensor for providing a compressor cycling signal;
   a processing module for determining a refrigerant charge level as a function of signals from the first, second, third, and fourth sensors; and
   an indicator for indicating that the level of refrigerant charge is acceptable if the refrigerant charge level is greater than a threshold value.

2. The system of claim 1 further comprising a second indicator for indicating that the level of refrigerant is unacceptable if the refrigerant charge level is less than the threshold value.

3. The system of claim 1 wherein the first and second sensors are temperature sensors and the third sensor is a humidity sensor.

4. The system of claim 1 wherein the fourth sensor is a voltage sensor.

5. The system of claim 1 wherein the first, second, and third sensors are not disposed on the vehicle.

6. The system of claim 1 wherein the fourth signal is provided to the processing unit by a powertrain control module mounted on the vehicle that controls engagement of a compressor clutch.

7. The system of claim 1 wherein at least one of the sensors selected from the group consisting of the first sensor, the second sensor, and the third sensor, is disposed on the vehicle.

8. The system of claim 7 wherein the third sensor is disposed on the vehicle and is connected to an air conditioning control module that controls an air temperature provided by the vehicle air conditioning system.

9. The system of claim 7 wherein the processing module is connected to a powertrain control module mounted on the vehicle to receive the fourth signal.

10. A method of assessing a level of refrigerant charge in a vehicle air conditioning system with a refrigerant assessment system, the vehicle air conditioning system including a refrigerant subsystem having a compressor adapted to circulate a refrigerant and an air handling subsystem for providing air cooled by the refrigerant subsystem to a vehicle passenger compartment, and the refrigerant assessment system including a control module adapted to receive a first signal indicative of a cooled air temperature, a second signal indicative of an ambient air temperature, a third signal indicative of an ambient air humidity, and a fourth signal indicative of cycling of the compressor between engaged and disengaged states, the method comprising the steps of:
calculating as a function of the first, second, third, and fourth signals a refrigerant charge value indicative of an amount of refrigerant in the vehicle air conditioning system;
determining whether the refrigerant charge value exceeds a threshold value indicative of a desired refrigerant charge amount; and
signaling that the level of refrigerant is acceptable if the refrigerant charge value is greater than the threshold value.

11. The method of claim 10 further comprising the step of signaling that the level of refrigerant is not acceptable if the refrigerant charge level is less than the threshold value.

12. The method of claim 10 wherein the first and fourth signals are sampled more frequently than the second and third signals.

13. The method of claim 10 wherein the level of refrigerant is determined as a function of the expression $$A1+A2(F1)+A3(F2)+A4(F3)+A5(F4)+A6(F5)+A7(F6)+A8(F7)+A9(F8)+A10(F9)+A11(F10)+A12(F11)+A13(F12)$$

where:
F1 is the larger numeric value of either 0 or (CYCLE COUNT−A14) where CYCLE COUNT is the number of times the compressor cycles between engaged and disengaged states,
F2 is the larger numeric value 0 or (A15−CYCLE COUNT),
F3 is the larger numeric value of 0 or (VENT TEMPERATURE−A16) where VENT TEMPERATURE is the temperature of the air provided by the air handling subsystem to the passenger compartment,
F4 is the larger numeric value of 0 or (A17−VENT TEMPERATURE),
F5 is the larger numeric value of either 0 or (CYCLE COUNT−A18),
F6 is the larger numeric value of either 0 or (HUMIDITY−A19) where HUMIDITY is the ambient air humidity,
F7 is the larger numeric value of either 0 or (A20−HUMIDITY),
F8 is the larger numeric value of either 0 or (TEMPERATURE−A21) where TEMPERATURE is the ambient air temperature,
F9 is the larger numeric value of either 0 or (A22−TEMPERATURE),
F10 is the larger numeric value of either 0 or (HUMIDITY−A23),
F11 is the larger numeric value of either 0 or (HUMIDITY−A24),
F12 is the larger numeric value of either 0 or (TIME−A25) where TIME is an amount of time that the compressor is engaged, and A1 through A25 are constants.

14. The method of claim 10 wherein the first signal indicative of a cooled air temperature is provided by a temperature sensor disposed near a vent aperture in the air handling subsystem.

15. The method of claim 10 wherein the second signal indicative of an ambient air temperature is provided by a temperature sensor.

16. The method of claim 10 wherein the third signal indicative of an ambient air humidity is provided by a humidity sensor.

17. The method of claim 10 wherein the fourth signal indicative of cycling of the compressor is provided by a powertrain control module disposed on the vehicle.

18. A method of assessing a level of refrigerant in an air conditioning system disposed in a vehicle, the vehicle having an engine, a compressor having a clutch and adapted to be driven by the engine and circulate a refrigerant to provide a cooling effect when the clutch is engaged, a duct for providing air cooled by the refrigerant to a vehicle passenger compartment, a first signal indicative of a cooled air temperature, a second signal indicative of an ambient air temperature, a third signal indicative of an ambient air humidity, and a fourth signal indicative of engagement of the clutch, the method comprising the steps of:
calculating as a function of the first, second, third, and fourth signals a refrigerant charge value indicative of an amount of refrigerant in the air conditioning system;
determining whether the refrigerant charge value exceeds a threshold value indicative of a desired amount of refrigerant in the air conditioning system; and
signaling that the level of refrigerant is acceptable if the threshold value is exceeded.

19. The system of claim 18 further comprising the step of signaling that the level of refrigerant is not acceptable if the threshold value is not exceeded.

20. The method of claim 18 wherein the second and third signals are sampled less frequently than the first and fourth signals.

* * * * *